Figure 2:
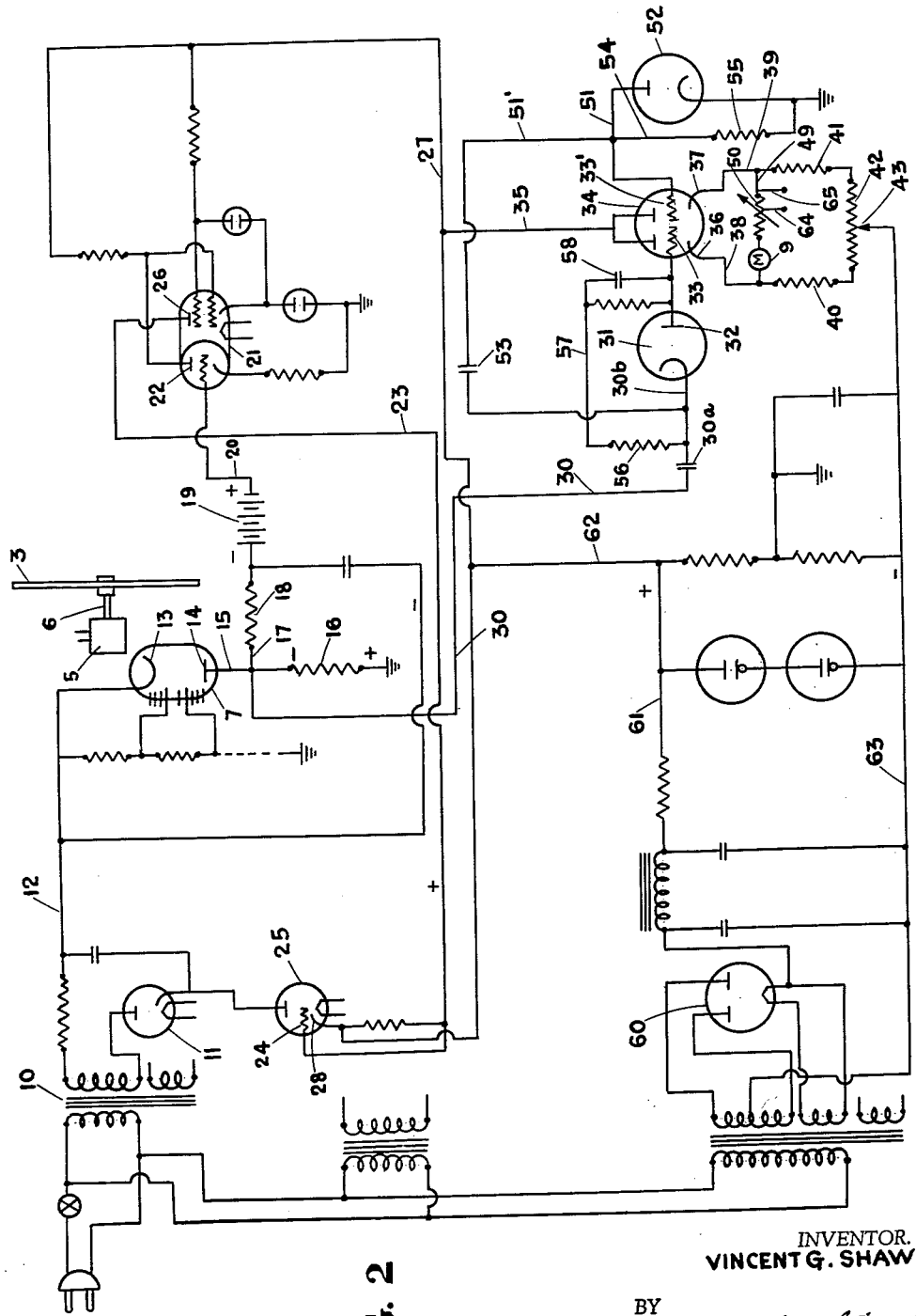

Oct. 31, 1961 V. G. SHAW 3,006,242
OPTICAL TEMPERATURE MEASURING APPARATUS
Filed April 1, 1958 2 Sheets-Sheet 1
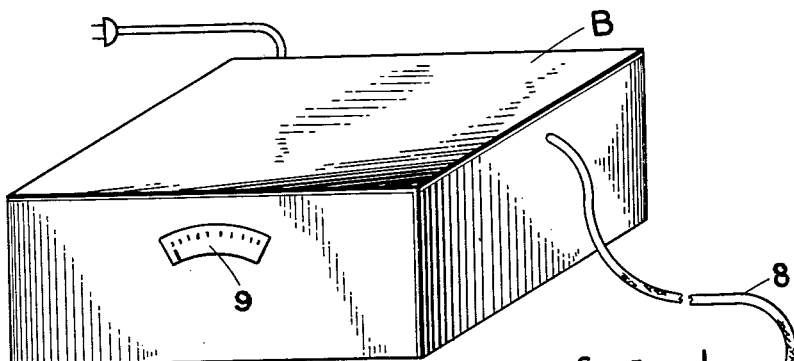
FIG. 1
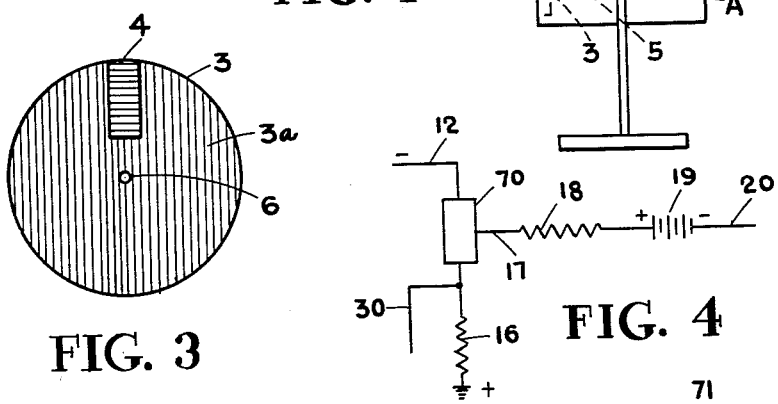
FIG. 3
FIG. 4
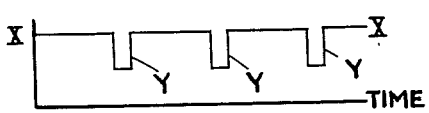
FIG. 5
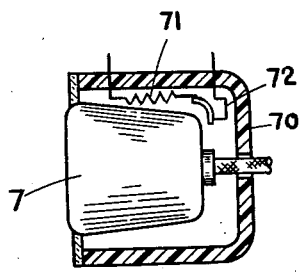
FIG. 6
INVENTOR.
VINCENT G. SHAW United States Patent Office 3,006,242
Patented Oct. 31, 1961

3,006,242
OPTICAL TEMPERATURE MEASURING APPARATUS
Vincent G. Shaw, Penn Township, Allegheny County, Pa., assignor to Latronics Corporation, a corporation of Pennsylvania
Filed Apr. 1, 1958, Ser. No. 725,550
12 Claims. (Cl. 88—22.5)

This invention relates to temperature measurement and is for an improved radiation responsive instrument for measuring the temperature of body or object.

It is well known that the energy distribution in the spectrum of a hot body is a function of its temperature. In other words as the temperature of a radiating body increases the energy toward the blue end of the spectrum increases. It has heretofore been proposed to measure the temperature by separate photo-sensitive elements scanning the object through filters that pass separated bands of the spectrum, as for example red and blue filters, and then determining the ratio between the emitted energy in these bands, which ratio may be interpolated in terms of temperature.

Measurement made by this method is of recognized theoretical value since it is the relative energies in the two selected wave bands which is measured, and therefore the radiant qualities or emissivity (ability to radiate light) of the object being observed are discounted, that is, it is immaterial whether the heat source is highly reflective or not. Therefore such procedure is theoretically superior to an optical pyrometer, for example, in which the surface emissivity or reflective properties of the object is a factor and must be known and remain constant.

Such two-element systems, however, are of little practical utility for several reasons, two important ones of which may be mentioned. It is inconvenient to take the ratio of two changing and variable qualities, such as the output of the two photo-sensitive elements and convert this ratio into an electrical quantity. For the system to be practical, this must be accomplished with speed and accuracy. This is especially true where the intensity of the heat source, due, for example, to a change of distance or solid angle between the hot body and the photo-sensitive cells, changes the response of both cells, and therefore the entire calibration of the instrument. Also, it is apparent that the photo-sensitive elements of such a system must remain relatively fixed. Since photo-sensitive elements may be affected by various things and to different degrees, so that the sensitivity or response of one relative to the other may deteriorate, a serious limitation to the use of said system under other than closely controlled laboratory conditions exists.

The present invention is also based on determining the ratio of energies in two separate narrow wave bands of the spectrum of the object or substance being measured, while eliminating within a wide range any affect of change of distance, reflectivity, or overall light intensity, and requiring but a single photo-sensitive element. Hence the instrument will discount or cancel out the effect of any change of intensity not accompanied by a change of temperature. The scanning device may be moved about the object or substance being measured, brought into close proximity, or moved away. The temperature of incandescent lamp filaments on a moving object may even be determined. The device at temperatures in the range of 2000° F. will easily perform accurately within 20° error, at the most, of results obtained with thermocouple pyrometers, and can be made to respond with a much less error and detect changes of 1° F. As a matter of fact it is difficult to determine whether the apparent discrepancy with a thermocouple is attributable to the thermocouple or to the apparatus of the present invention. For most industrial and metallurgical purposes accuracy within twenty degrees is adequate and the finer instrumentation and cost required for greater accuracy is not, in most cases, justified.

Aside from convenience over either an optical pyrometer or a thermocouple and the fact that the instrument does not have to be close to or contact the radiating body, the invention has a great element of economy over thermocouples wherein contact with or immersion in a hot body deteriorates the tip, which must be continually replaced.

My invention has for its principal object the provision of a temperature measuring device responsive to the radiant energy in different wave bands of the spectrum of the object or body under observation which will discriminate between the radiant energy in different wave bands of the spectrum as against overall changes in the energy due to the change in the distance of the apparatus from the object being observed or the change in the solid angle between the measuring device and said object or its emissivity. A further object of my invention is to provide heat measuring apparatus of this character which uses a single photo-sensitive element, which is convenient to use, and which after assembly, requires little in the way of adjustment during operation.

These and other objects and advantages are secured by my invention, which may be more fully understood by reference to the accompanying drawings which show an embodiment thereof, and in which:

FIG. 1 is a general view of an embodiment of the apparatus showing its overall physical organization;
FIG. 2 is a circuit diagram of the instrument itself;
FIG. 3 is a face view of the shutter or filter disk;
FIG. 4 is a fragmentary diagram showing a modification;
FIG. 5 is a diagram showing a typical wave form impressed on the measuring instrument circuit; and
FIG. 6 is a fragmentary view of an improvement in the housing for the photo-multiplier tube.

Referring first to FIG. 1 of the drawings, the apparatus in its overall construction embodies a scanning unit or sensing head A and power pack and instrument box B, which I term the control unit. A is conveniently connected to B through a multiple conductor flexible cable so that it may be moved about respect to B.

The scanning device or sensing head in its most elementary form comprises an enclosing box 1 with a window or orifice 2 through which light may enter the box. Inside the box is a rotatable shutter or filter 3 which may be simply a disk such as shown in FIG. 3 having a major color band filter 3a over most of its area with a second smaller different color band filter 4 over a small portion of its area. Typically 3 may be red plastic or glasss, and 4 blue plastic or glass, and the proportions are such that when the disk revolves across the opening, light from an outside source, i.e., the radiating body whose temperature is to be measured, passes through the red filter about 90% of the time and through the blue filter about 10%. It is a difference of this general order that I refer to as "large" and "small," but the ratios are not too critical and I have referred to red and blue simply as typical band filters, and if desired blue could be large and red small, although circuits would have to be changed or the calibration of instruments changed in this latter event.

The disk is rotated at a speed of the order of several hundred r.p.m. by a small motor 5 on the shaft 6 on which the disk is mounted. Typically, I rotate the disk at 3600 r.p.m. In the case 1, back of the disk, is a photo-sensitive unit, as for example a photo multiplier tube 7 which receives light entering through the orifice and passing through the rotating filter. The cable 8 provides wiring for the motor and photo-sensitive unit circuit to the box B which houses a voltmeter or micro volt meter 9 and circuits as hereinafter described. The voltmeter is conveniently calibrated in degrees of temperature.

To further understand my invention, reference may now be had to FIG. 2. In this figure I have shown schematically the essential parts of a circuit for the functioning of my invention. In this figure, power from a commercial lighting circuit is used. Power from this source passes through a transformer 10, and the high voltage from the secondary of this transformer is passed to a half way rectifier circuit including a diode 11, and a filtering resistance and condenser, and the negative output is connected through wire 12 to the cathode 13 of a photo multiplier tube 7. The preferred D.C. voltage is of the order of 1500 volts.

The anode 14 of the photo multiplier tube is connected to the positive (ground) through wire 15 and resistor 16 which I term a "load resistor." The anode is also connected through wire 17 between the anode and resistor 16 to a resistor 18 which is connected to the negative pole of a D.C. biasing voltage, more correctly called a reference voltage source, indicated by the standard 22½ volt battery 19. The positive side of battery or D.C. source 19 is connected by wire 20 to the input grid of an amplifier circuit including a standard 6AN8 tube 21 and typical circuit therefor. One anode 26 of this tube is connected through wire 23 to the grid 24 of a tube 25 that acts as a regulator for the rectifier 11, while the other anode 22 of the amplifier is connected through wire 27 with the cathode 28 of the tube 25.

The operation so far is as follows: If light falls on the photo-multiplier tube, the positive current flow from ground to the anode is blocked by the resistor 16 and its flow to the amplifier circuit is blocked by the negative polarity of the battery 19 until such time as the light is strong enough to generate a voltage greater than the 22½ volts of the battery, plus enough to overcome certain inertia in the amplifier, say 24 volts in all.

The light intensity must reach a point where the current passed by the photo-multiplier tube must overcome this reference voltage, here assumed to be 24 volts, before there is an effective current flow to the grid of the amplifier tube 21. This is therefore the minimum level of light intensity to which the system will respond. When the overall light intensity on the photo-multiplier tube increases to overcome the reference voltage, the potential drop across the anode load resistor 16 of the photo-multiplier tube will be fed to the ampler circuit, and a curent will be fed back to the control tube 25 to cause the rectifier to pass less current and bring the wire 12 and the cathode of the photo-multiplier tube to a lower voltage and re-establish the correct potential across the anode load resistor, and it will then be as though the photo-multiplier tube "sees" no increase at all in the light intensity. There is a short desirable time lag in the functioning of this circuit. Desirably this lag is greater than the time required for the blue or small segment of the filter to move past the photo-multiplier tube, but preferably does not exceed the time for the filter to rotate through a complete cycle.

The effect of this is that after a minimum light intensity is reached the photo-multiplier tube will in effect "see" any intensity above this minimum intensity as if it were of uniform intensity, except for the desirable time lag that takes place when the circuit is correcting itself because of change of intensity.

Most of the time the photo-multiplier tube "sees" the radiated light from the object being observed through the red area of the disk. When the blue area moves across the tube "line of vision" there is a change of intensity, but it occurs so quickly that it is out of the line of vision of the tube before the amplifier circuit, because of the lag in its response, can function to make any correction. The output of the photo-multiplier tube is carried by wire 30 to a peak reading voltmeter circuit. Hence the normal current flow in wire 30 is a steady reference current with a short impulse or "pip" every time the blue segment of the disk moves before the photo-sensitive tube. This is represented in FIG. 5 where line X—X represents the reference level and the straight-sided dip Y of short distance is created when the blue passes before the photo tube. If the blue segment were made of large area, say about equal to the red, the depression would not be of square wave form but would start to climb on an incline back to the reference level by reason of the automatic ability of the circuit to always return to the reference level. It is for this reason that a lag or inertia factor is built into the amplifier-regulator circuit comprising the tube 21 and the regulator tube 25. The apparatus is therefore able to discriminate between the short impulses represented by the difference in energy between the red and blue bands and any overall change in intensity.

To better understand this, it may be pointed out that in one second, for example, the scanning apparatus may be moved from a twelve foot distance from the radiating body to six feet. This is adequate time (actually more than adequate) for the circuit to regulate itself to the increased light intensity while, if the disk is rotating sixty revolutions a second or 3600 r.p.m. and the blue has an effective area equal to 10% of the disk, the "blue" "impulse" will be generated 60 times for $\frac{1}{10}$ of $\frac{1}{60}$ of a second. In other words, changes of overall intensity of the light is relatively gradual as compared to the duration of a single "pip," so that the overall change in light intensity is unimportant in the response of the instrument. The depth of the "pip" in FIG. 4 below the reference line will respond directly to the difference in energy between the red and blue bands of the spectrum, and hence indicate the temperature of the body in accordance with Wien's law.

Wire 30 is connected through a blocking condenser 30a and wire 30b to the cathode of a half wave rectifier 31, and the plate or anode 32 of this rectifier is connected to one grid 33 of double triode 34 which is a type 6SL7 tube. The two plates of this tube are connected through wire 35 to a source of plate voltage, to be hereafter described. The two cathodes 36 and 37 of this double triode are connected through wires 38 and 39 and resistances 40 and 41 respectively to opposite ends of a resistance or potentiometer 42, and a negative voltage is impressed on a mid point of this resistor as indicated at 43.

There is a bridge circuit 49 across the wires 38 and 39 that includes the sensitive micro-volt meter 9 calibrated in degrees and a variable resistance 50. The other grid 33' of the double triode is connected through wire 51 with the anode of a diode 52 which is the counterpart of diode 31, and also through wire 61' including blocking condenser 53 with the wire 30b. The grid 33' is also connected through wire 54 and resistance 55, to the cathode of diode 52. There is a circuit in parallel with diode 31 comprising a resistance 56, wire 57 and condenser 58 to the first grid 33 of the double triode 54.

Beyond the wire 30 the circuit is essentially a peak reading voltmeter circuit. When all conditions are in balance, no current flows through the bridge circuit including the meter 9. The impulses generated by the blue filter disturb this balance, tending to build up a charge on the condenser 58, thereby tending to keep a positive charge on the grid 33, to deflect the meter 9, the extent of deflection depending on the amplitude of the impulses. It is therefore desirable that the color filter operate at a rapid frequency in order that the pulsations or "pips" are in close succession. The diode 52 impresses a constant voltage equal to the reference voltage on the grid 33'. The provision of wire 51' and condenser 53 slightly reduces the sensitivity of the response of the voltmeter 9, but aids in balancing out tube or background "noise," but since the condenser 53 is of much smaller value than condenser 58, the former being approximately .001 mfd. and the latter being for example .01 mfd. and there being no resistance corresponding to 56, the desired signal is not balanced out, but only slightly reduced.

The remainder of the circuit is essentially a conventional "power pack" for supplying D.C. current to the double triode, including a full wave rectifier tube 60 and the conventional circuit therefore including stabilizers and filters, a positive voltage being impressed on wire 61, connecting through wire 62, wire 27 and wire 35 to the two anodes of the tube 34. The negative side of the rectifier represented by wire 63 connects approximately to the mid point of resistance 42 as indicated at 43, being adjustable as conditions may require.

If a recording instrument is also desired, it may be tapped into the bridge circuit, as at points 64 and 65.

In the drawings I have only schematically indicated the several dynodes of the photo-multiplier and one skilled in the art will appreciate that a wide range of modifications may be made in the various circuits to secure a corresponding function.

In the lower temperature ranges a cadmium or lead sulfide or other photo-sensitive cell responsive to infrared radiations in the longer end of the range may be substituted for a photo-multiplier tube, in which case the voltage from the input rectifier 11 would be of the order of 200 volts instead of 1500 volts. This is shown in FIG. 4 where 70 indicates a photo-responsive cell such as a cadmium sulfide cell or a selenium or like cell in place of a photo-multiplier tube.

For greater stability the modification shown in FIG. 6 may be used. A photo-multiplier tube will change its response to an increase in temperature as it operates. I surround the tube 7 with an enclosure 70 in which is a thermostatically-controlled electric heater 71 to maintain a constant temperature about the tube so that it will not be subject to temperature variation in operation. In FIG. 6 the tube is shown in elevation, and the housing in section. A bimetal or other thermostat is diagrammatically indicated at 72.

By having the sensing head separate from and connected with the control box, the device has great flexibility and maneuverability since the sensing head weighs but a few pounds, while the apparatus in the control box is necessarily heavier and bulkier. Filters are selected according to the temperature range in which the instrument is used, and within this range it will cover a wide temperautre span, if desired, of a range up to at least 2500° F. and detect changes as small as 1°. There is a negligible drain on battery 19, so that it may be used for long periods of time without replacement.

While primarily useful in measuring the temperature of a radiating body, it may also be used in other applications where light qualities are to be determined, as for example the matching of colors. In such cases the standard color is observed through a standard lamp to secure a basic calibration of the instrument. Any other object of the same color viewed in the same light will then give the same indication, while a color which is different or off shade will give a different indication.

Having shown and described certain specific embodiments of my invention, I claim:

1. Apparatus for determining the temperature of a heat-radiating body comprising a photo-sensitive element, means for alternately passing two separated wave bands of the spectrum of the body for dissimilar periods of time in rapid but continuous succession over one light path to the photo-sensitive element, an output circuit for the photo-sensitive element, the alternate exposure of the photo-sensitive element to the separate wave bands producing a succession of electrical pulses in the output circuit of different magnitude and duration, means for measuring the difference in magnitude of said pulses, and means in the output circuit for discriminating between changes in the overall intensity of the radiated light and changes due to the difference in energy in the two wave bands producing the pulses and effectively neutralizing those changes in the output representing changes in the overall intensity, the time difference between the exposure of the light-sensitive element to the two selective wave bands serving to enable said means in the output circuit to more effectively discriminate between the differences in energy in the two selected wave bands and overall changes in light intensity.

2. Apparatus for determining the temperature of a heat-radiating body as defined in claim 1 in which the photo-sensitive element is a photo-multiplier tube with a cathode and an anode, and a source of direct current supply to the cathode and anode, said discriminating means comprising a load resistor in the output circuit between the anode and the positive pole of the current source for the anode, an amplifier, a source of direct current having its negative pole connected with the anode of the photo-multiplier tube between the anode and load resistor and its positive pole connected to the input of the amplifier, and means controlled by the amplifier for regulating the current source for the photo-multiplier tube to maintain the potential drop across the photo-multiplier tube load resistor substantially constant as the resistance of said tube varies with changes in the overall intensity of the radiated energy.

3. Apparatus for determining the temperature of a heat-radiating body as defined in claim 1 in which the said means for measuring the amplitude of the pulses comprises a bridge having an anode, cathode and grid in one arm, a resistance through which the last named cathode is connected to the negative pole of a direct current source as a second arm, a third arm having an anode, cathode and grid similar to the first and a fourth arm comprising a resistance to which the second cathode is connected to the same negative pole of a direct current source as the second arm, a bridging circuit including a volt-meter and resistance in series connected at one end between the first and second of the above arms and at its other end between the third and fourth arms, a common source of direct current having its positive pole connected to the two anodes in said bridge circuit and its negative pole connected to the aforesaid resistances in the third and fourth bridge arms, a half wave rectifier having its output connected to the grid in the first arm of the bridge and its input connected with the output circuit of the photo-multiplier tube, a second half wave rectifier having its output connected to the second grid and to the input of the first half wave rectifier through a blocking condenser, and a condenser and resistance in series comprising a shunt circuit around the first rectifier tube, said last-named condenser having a capacity greater than the capacity of the aforesaid blocking condenser.

4. Apparatus of the class described comprising a photo-multiplier tube with an anode and cathode, a load resistor through which the anode of the photo-multiplier tube is connected to the positive side of a direct current source, a connection leading from a point between the anode and load resistor to a peak reading indicator circuit, a connection leading from a point between the anode and load resistor to the input of an amplifier circuit, a fixed source of reference voltage in said last-named connection having its negative pole connected to the anode of the photo-multiplier tube and its positive terminal to the input of the amplifier circuit, a direct current source for maintaining a potential difference between the anode and cathode of the photo-multiplier tube, means controlled by said amplifier circuit for regulating the direct current source to lower the voltage in said source as the photo-multiplier tube responds to increase in light and increase the voltage as it responds to diminishing light to maintain a substantially constant potential drop across the load resistor, contrasting large and small color band filters operable to alternately transmit separate color bands over a single path to the photo-multiplier tube, and means for operating the filter to alternately transmit their respective color bands to the photo-multiplier tube more rapidly than the response of the amplifier circuit to an increase or decrease in the overall light intensity of the source of light to which the filters are exposed, whereby impulses are transmitted in rapid succession to the peak reading indicator circuit which impulses are a function only of the difference in radiant energy between the two wave bands.

5. Apparatus as defined in claim 4 in which the photo-multiplier tube, color band filters and filter operating means are separately housed in a portable container and the balance of the apparatus is in a separate enclosure, the two being connected by a flexible cable.

6. Apparatus for measuring differences of energy in two separate color bands of light comprising a single photo-sensitive element, a movable filter through which a single beam of light is transmitted continuously over one path to the photo-sensitive element, said filter having contrasting color areas of different effective sizes through which the two color bands are alternately transmitted to the photo-sensitive element for unequal intervals of time, means for operating the filter, a source of direct current for the photo-sensitive element, and means for varying the voltage of said current source inversely with a change in conductivity of the photo-sensitive element due to an overall change in light intensity to which the photo-sensitive element is exposed, said last-named means being too sluggish to respond to changes of energy resulting from the alternate changing of the filters whereby pulsations are generated in the output of the photo-sensitive element, the amplitude of which is a function only of the difference of energy in the two color bands, and means for measuring the amplitude of the pulsations.

7. A temperature measuring device comprising a photo-sensitive element with an energizing circuit and an output circuit, a control circuit connected into the energizing and output circuits for establishing the minimum level of radiant energy to which the photo-sensitive element will respond and to reduce the sensitivity of said element as the overall radiant energy increases above said minimum level to thereby avoid fluctuation in the response of the light-sensitive element with changes in the overall light intensity to which it is exposed, means comprising an aperture and single light path from the aperture to the photo-sensitive element over which light passes from a light source to the photo-sensitive element, a filter in said single light path between the aperture and the photo-sensitive element having two contrasting filter areas for passing separate wave bands of light therethrough and which are movable alternately across said light path and through one or the other of which the photo-sensitive element is constantly exposed to light passing through the aperture, means for moving said filter areas across said light path at a speed above the speed of response of said control circuit to variations in overall light energy above the minimum level to thereby generate pulsations of unequal intensity in the output circuit of said element due to the unequal radiant energy in the two wave bands of light to which the photo-sensitive element is alternately exposed, and means for detecting and indicating the difference between the intensities of the alternating pulsations.

8. A temperature measuring device as defined in claim 7 wherein the contrasting filter areas are of effectively unequal extent whereby exposure of the photo-sensitive element to one wave band is shorter than the exposure to the other to thereby render the difference in the intensity of the alternating pulsations to be more effectively detected and measured.

9. Apparatus for determining temperature from the radiated energy of a radiant body comprising an enclosure having an opening for admitting a single beam of light from the radiant body into the enclosure, a photo-multiplier tube in the enclosure positioned to be activated by the light so admitted, a color screen interposed between the opening and the photo-multiplier tube having two contrasting colored filters of different effective areas which filters are movable alternately across the single path of light to alternately subject the photo-multiplier tube to different wave bands of light from the emitting source for unequal periods of time, a constant sensitivity circuit for limiting the output of the photo-multiplier tube to a predetermined maximum whereby it is substantially unresponsive to changes in the overall intensity of the activating light beam above a predetermined minimum, means for actuating the color screen to alternate the color of light reaching the photo-multiplier tube at a rate above the rate of response of the constant sensitivity circuit to the difference in energy in the two wave bands, whereby the output energy of the tube varies rapidly in response to the differences of energy in the two wave bands to which the tube is exposed and to which the constant sensitivity circuit is unresponsive, and a peak-reading voltmeter circuit including a voltmeter operatively connected to the output of the photo-multiplier tube for measuring the response of the photo-multiplier tube to the differences in radiant energy in the two wave bands of light alternately transmitted thereto.

10. Apparatus for measuring the temperature of a radiant body comprising an enclosure having a light admitting aperture through which a beam of light from the source to be measured enters the enclosure, a photo-sensitive element in the enclosure positioned to receive a beam of light so admitted over a single light path only, said photo-sensitive element having anode and cathode terminals, a source of direct current, a load resistor through which the anode is connected with the positive pole of the direct current source, the cathode being connected to the other pole of said direct current source, a control circuit connected to said anode at a point between the anode and the load resistor and responsive to the flow of current through the photo-sensitive element for regulating the direct current source to maintain a substantially constant potential drop across the load resistor with changes in the flow of current through the photo-sensitive element due to the change in overall light intensity on the photo-sensitive element, filter means operable across the light beam to the photo-sensitive element having two color filters for alternately transmitting separate wave bands of the spectrum of the light from the radiant body to said photo-sensitive element, means for operating the filter at a rate above the rate of response of the control circuit, and a metering circuit connected with the anode of the photo-sensitive element for receiving impulses generated by the photo-sensitive element in response to the alternations in the output thereof by reason of the differences in energy in the two wave bands, said metering circuit including an electric meter.

11. Apparatus for measuring the temperature of a radiant body as defined in claim 10 in which the color filter has the effective color areas of widely different extent whereby the impulse produced by the smaller of the filter areas in passing across the light beam is of substantially shorter duration than that produced by passage of the larger area across the light beam.

12. Apparatus for measuring differences in energy in two separate color bands of light source comprising a single photo-sensitive cell, having a cathode and anode, a source of direct current having its negative pole connected with the cathode, a load resistor through which the positive pole of the direct current source is connected with the anode of said cell, a constant sensitivity control circuit for the direct current source for keeping the voltage drop across the load resistor substantially constant with variations in the conductivity of the photo-sensitive cell to overall changes in intensity of the light source being measured, said constant sensitivity control circuit including a vacuum tube having a grid connected with the anode of the photo-sensitive cell between the anode and the load resistor, a source of constant reference voltage connected in series between the anode of the photo-sensitive cell and the said grid having its negative pole connected with the anode of the cell and positive pole connected with the said grid, an enclosure for the photo-sensitive cell having a light admitting aperture providing a single light path from the aperture to the cell, a movable filter in said light path having contrasting wave band filters through which two color bands may be alternately transmitted over said light path to the photo-sensitive cell, means for moving the filter to alternate the wave bands so transmitted at a rate higher than the rate of response of the constant sensitivity control circuit whereby pulsations are generated in the output of the photo-sensitive cell due only to the difference in energy in the two wave bands, and means connected with the anode of the photo-sensitive cell between the cell and the load resistor and responsive to said pulsations for indicating the magnitude of the pulsations.

References Cited in the file of this patent

UNITED STATES PATENTS

| | | |
|---|---|---|
| 2,454,871 | Gunderson | Nov. 30, 1948 |
| 2,457,747 | Sweet | Dec. 28, 1948 |
| 2,478,163 | Sweet | Aug. 2, 1949 |
| 2,515,762 | Dimmick | July 18, 1950 |
| 2,648,253 | Sweet | Aug. 11, 1953 |
| 2,674,155 | Gibson | Apr. 6, 1954 |
| 2,808,755 | Millen | Oct. 8, 1957 |